United States Patent
Jones et al.

(10) Patent No.: US 10,866,364 B1
(45) Date of Patent: Dec. 15, 2020

(54) SYSTEMS, METHODS, AND APPARATUS FOR OPTICAL TRANSCEIVER WITH MULTIPLE SWITCH STATE CONFIGURATIONS

(71) Applicant: Juniper Networks, Inc., Sunnyvale, CA (US)

(72) Inventors: Kevan Peter Jones, Kanata (CA); Robert William Keys, Stittsville (CA)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/420,791

(22) Filed: May 23, 2019

(51) Int. Cl.
  *G02B 6/35* (2006.01)
  *H04Q 11/00* (2006.01)
  *H04L 12/931* (2013.01)
  *H04J 14/02* (2006.01)
  *G02B 6/26* (2006.01)
  *G02B 6/12* (2006.01)

(52) U.S. Cl.
  CPC .......... *G02B 6/3542* (2013.01); *G02B 6/268* (2013.01); *G02B 6/355* (2013.01); *H04J 14/0212* (2013.01); *H04L 49/357* (2013.01); *H04Q 11/0001* (2013.01); *G02B 2006/12111* (2013.01); *G02B 2006/12145* (2013.01); *G02B 2006/12147* (2013.01); *G02B 2006/12152* (2013.01)

(58) Field of Classification Search
  None
  See application file for complete search history.

(56) References Cited

U.S. PATENT DOCUMENTS

| 9,209,901 B2 * | 12/2015 | Dahlfort | H04B 10/40 |
| 2003/0007219 A1 | 1/2003 | Stilling | |
| 2005/0180749 A1 * | 8/2005 | Koley | H04J 14/0294 398/45 |

(Continued)

OTHER PUBLICATIONS

Cable Television Laboratories, Inc., Point-to-Point Coherent Optics, P2P Coherent Optics Architecture Specification, P2PCO-SP-ARCH-I02-190311, Mar. 11, 2019, 36 pages.

(Continued)

*Primary Examiner* — Tina M Wong
(74) *Attorney, Agent, or Firm* — Cooley LLP

(57) ABSTRACT

According to various aspects of the present disclosure, an apparatus is provided. In an aspect, the apparatus includes an optical transceiver having a first port, a second port and an optical switch coupled to the first port and the second port. The optical switch is switchable between a unidirectional port operation mode and a bidirectional port operation mode. When the optical switch is in the unidirectional port operation mode, the first port is configured to send a first optical signal, and the second port configured to receive a second optical signal. When the optical switch is in the bidirectional port operation mode, the first port configured to send the first optical signal and receive the second optical signal, and the second port configured to receive a third optical signal and not send the first signal. Furthermore, a second bidirectional port operation mode is supported with the second port configured to send the first optical signal and receive the second optical signal, and the first port configured to receive a third optical signal and not send the first signal.

20 Claims, 7 Drawing Sheets

(56) References Cited

U.S. PATENT DOCUMENTS

| | | |
|---|---|---|
| 2011/0116647 A1* | 5/2011 | Terlizzi ................ G02B 6/3817 |
| | | 381/71.6 |
| 2013/0071127 A1* | 3/2013 | Ota .................... H04B 10/2503 |
| | | 398/139 |
| 2014/0140689 A1 | 5/2014 | Dahlfort et al. |

OTHER PUBLICATIONS

Urata, R. et al., "High Performance, Low Cost, Colorless ONU for WDM-PON," Presented at OFC/NFOEC, Mar. 2012, 3 pages.

Kjeldsen, P. et al., "Choose the Right Topology for Your Fiber-to-the-Home Network," Gartner, Inc., [Online], Retrieved from the Internet: <URL: https://www.bus.umich.edu/kresgepublic/journals/gartner/research/118400/118478/118478.html#h2>, Nov. 2003, 6 pages.

Extended European Search Report for European Application No. 19183136.1, dated Jan. 30, 2020, 10 pages.

\* cited by examiner

US 10,866,364 B1

SYSTEMS, METHODS, AND APPARATUS FOR OPTICAL TRANSCEIVER WITH MULTIPLE SWITCH STATE CONFIGURATIONS

FIELD

The present disclosure relates generally to the field of optical transceivers for optical telecommunications, and in particular, to an optical transceiver with multiple switch state configuration capability for configuration and control in, of, and for optical access networks.

BACKGROUND

To meet the growing demand for high rates of data transfer or bandwidth and capacity in access networks, optical networks such as passive optical networks (PON(s)), including, for example, wave-division multiplexed-PONs (WDM PON(s)), and the like, can be implemented. For example, PONs such as WDM PONs can be implemented to provide a logical or virtual point-to-point (P2P) network topology over a physical, point-to-multipoint (P2M) fiber-based network topology. This can provide for simpler, more efficient, and sustainable network capabilities that can scale with the growing demand, and further, provide, in some instances—longer reach, greater security, and higher capacity and bandwidth (per user), and the like. PONs such as WDM PONs can provide an economical, efficient, and scalable network architecture (e.g., fiber-to-the-X (FTTx) network architecture) by which the growing demand can be met, however, various technical challenges contributing to the cost associated with the operation, administration, and maintenance (OA&M) of such networks still exist.

SUMMARY

In one embodiment, the apparatus includes an optical transceiver having a first port, a second port and an optical switch ("optical switch" or "optical port configuration switch" or "port configuration switch") coupled to the first port and the second port. The optical switch is switchable between a unidirectional port operation mode and a bidirectional port operation mode. When the optical switch is in the unidirectional port operation mode, the first port is configured to send a first optical signal, and the second port is configured to receive a second optical signal. When the optical switch is in the bidirectional port operation mode, the first port is configured to send the first optical signal and receive the second optical signal, and the second port is configured to detect a third optical signal and not receive the first signal and the second optical signal.

DETAILED DESCRIPTION

Figure 1:
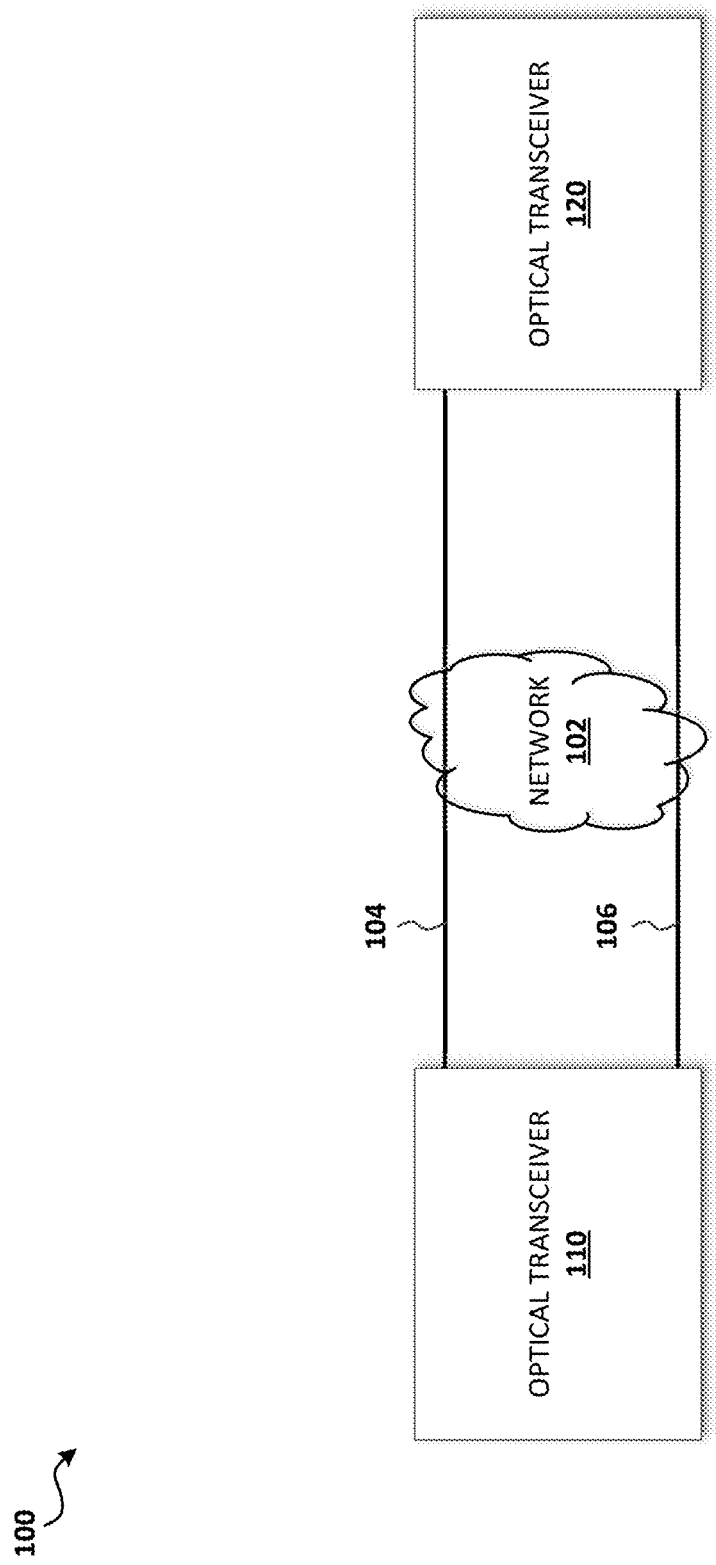
FIG. 1 is a functional block diagram depicting an optical communications system, in accordance with an embodiment.

A PON such as a WDM PON can include, for example, an upstream node such as a provider-side optical line terminal (OLT(s)) that is interconnected, via one or more communication channels, paths, or links ("channel(s)", "path(s)", "link(s)"), to a downstream node such as a client- or user-side optical network unit (ONU(s)). The links can include, for example, optical fibers ("fiber(s)") such as one-way or unidirectional fibers ("unidirectional channel(s)" or "unidirectional path(s)"), two-way or bidirectional fibers ("bidirectional channel(s)" or "bidirectional path(s)"), and the like. Network traffic and signals ("traffic" "network traffic" or "data communications" or "signal(s)") can be routed, for example, over and across a WDM PON and between nodes via links including unidirectional paths and/or bidirectional paths. For example, signals can be transmitted and received, between nodes and via one or more unidirectional and bidirectional paths, by optical transceivers at each node.

For example, a link interconnecting a particular pair of nodes (e.g., including an optical line terminal (OLT) and an optical network terminal (ONT)) in a WDM PON can include one or more unidirectional paths configured to support, for example, one-way data communications to provide TV or radio broadcast services to an end-user. As another example, a link interconnecting a particular pair of nodes (e.g., end-user premises and ONT) in the WDM PON can include one or more bidirectional paths configured to support, for example, two-way data communications to provide Internet access services to an end-user. Optical transceivers disposed at individual nodes in the WDM PON are typically used to transmit and receive the data communications via links that include both unidirectional and bidirectional paths.

In general, once deployed in an access network such as a WDM PON, known optical transceivers are configured to operate in one of a unidirectional port operation mode (or simplex (two fiber) communications mode) and a bidirectional port operation mode (or a duplex (one fiber) communications mode), and typically involve manual, on-site reconfiguration (e.g., at a physical location of an ONU). Moreover, in some instances, reconfiguring a known optical transceiver, to switch the transceiver from one mode of communication or operation to another, may require installation of additional equipment. Further, known coherent optical transceivers are typically configured for one of unidirectional or bidirectional communications—not both. For example, known optical transceivers such as coherent optical transceivers, and the like, typically share a common signal source for uni-directional operation—and for bidirectional operation, typically use separate signal sources for signal transmission and receipt. This can contribute to the costs associated with the operation, administration, and maintenance (OA&M) of the access network, due in part to the number of parts necessitated by the known optical transceivers, coherent optical transceivers, and the like.

Accordingly, a need exists for systems and methods by which to overcome the aforementioned limitations associated with the known optical transceivers. Some embodiments described herein are directed to an optical transceiver that provides software-based programmability between, for example, simplex and duplex operation.

Advantageously, some embodiments described herein can be used to control and automate the deployment, configuration, operation, control, and maintenance of optical access networks such as WDM PON, and the like.

In some embodiments, an optical transceiver includes one or more adjustable signal sources (e.g., tunable laser sources). In the case of at least two adjustable signal sources, one of the signal sources can be used for signal transmission at a first wavelength on a transmit side (e.g., of a communication channel), and the other of the signal sources can, if desired, operate at a second wavelength substantially equal to the first wavelength. The second wavelength can otherwise be different than the first wavelength. In some embodiments, multiplexing and demultiplexing functions are provided by a combination of a coupler (e.g., 2×2 coupler) and variable optical attenuators (e.g., 1×1 switches) configured to provide controlled coupling to enable and provide selective signal routing, passing, and blocking capability. This manner of multiplexing and demultiplexing enables path protection via diverse paths. In some embodiments, an optical (e.g., directional) isolator can be used as part of the signal passing and blocking capability. In some embodiments, the optical transceiver instead includes only one adjustable signal source (e.g., tunable laser source) and an additional modulator for carrier suppressed modulation (e.g., to generate two carrier or baseband signals having different wavelengths). In some embodiments, the only one adjustable signal source can be, for example, a multi-wavelength source, usable in conjunction with one or more ring resonators for selective wavelength-selective operation.

FIG. 1 is a functional block diagram depicting an optical communications system 100, in accordance with an embodiment. As shown, the optical communications system 100 includes optical transceiver 110 and the optical transceiver 120, which can otherwise be configured to operatively interconnect, via the path 104 and the path 106, to enable, generate, provide, transmit, and receive signals and communications over network 102. While the optical communications system 100 is depicted in FIG. 1 as including two discrete devices (e.g., 110, 120), interconnected by two elements (e.g., 104, 106) other arrangements are possible. For example, the optical transceiver 110, the optical transceiver 120, the path 104, and/or the path 106 can otherwise respectively and individually include or be suitably formed of one or more integrated devices or materials.

The optical communications system 100 represents an optical access network system. The optical communications system 100 can be configured to operate in various modes of communication, including, for example, a simplex mode or a duplex mode. The optical communications system 100 can include or be configured to communicate with a network (e.g. network 102) such as an access network such as a PON, WDM PON, dense wave-division multiplexed PON (DWDM PON), or the like. The optical communications system 100 can include any suitable network topology or combination of network topologies, any of which can be physical, logical, or virtual, including, for example, a point-to-multipoint (P2M) network topology, a point-to-point (P2P) network topology, and the like. The optical communications system 100 can otherwise include any suitable type of access network having any suitable network topology, architecture, or characteristic, in accordance with embodiments of the present disclosure.

In some implementations, network 102 can include, for example, an intranet, a local area network (LAN), a metropolitan area network (MAN), a backhaul network, a fronthaul network, a long-haul network, and/or a wide area network (WAN) such as the Internet, and can include wired and/or fiber optic connections. Network 102 can otherwise include any combination of connections and protocols configured to support communications nodes (not depicted).

The path 104 and the path 106 represent respective and individual links (that can implement one or more communication channels). The path 104 and/or the path 106 can include, for example, one or more unidirectional paths, bidirectional paths, and the like. For example, the path 104 and/or the path 106 can respectively and individually include a common optical fiber (or multiple optical fibers) that interconnects the optical transceiver 110 and the optical transceiver 120, such as shown in FIG. 1.

As another example, the path 104 and/or the path 106 can, with or without one or more other fibers, be bundled, disposed, and insulated in an optical cable. The optical cable can include, for example, an insulating jacket in which the bundled fibers can be disposed. The path 104 and/or the path 106 can otherwise respectively and individually include any suitable type of communication channel, as such can be used in an optical access network such as a PON, WDM PON, and the like, in accordance with embodiments of the present disclosure.

The path 104 and/or the path 106 each represent a respective communications link, path, or channel in network 102. For example, the path 104 and/or the path 106 can be disposed between and used to interconnect nodes (e.g., optical transceiver 110, optical transceiver 120) in the network 102. The path 104 and/or the path 106 can each include, for example, a unidirectional signal communications path ("unidirectional path"), a bidirectional signal communications path ("bidirectional path"), and the like. The path 104 and/or the path 106 can include, for example, paths capable of conveying network traffic and signals in an optical communications system such as the optical communications system 100. The network traffic and signals can include, for example, optical signals such as frequency tunable signals, coherent signals, and the like.

Figure 2:
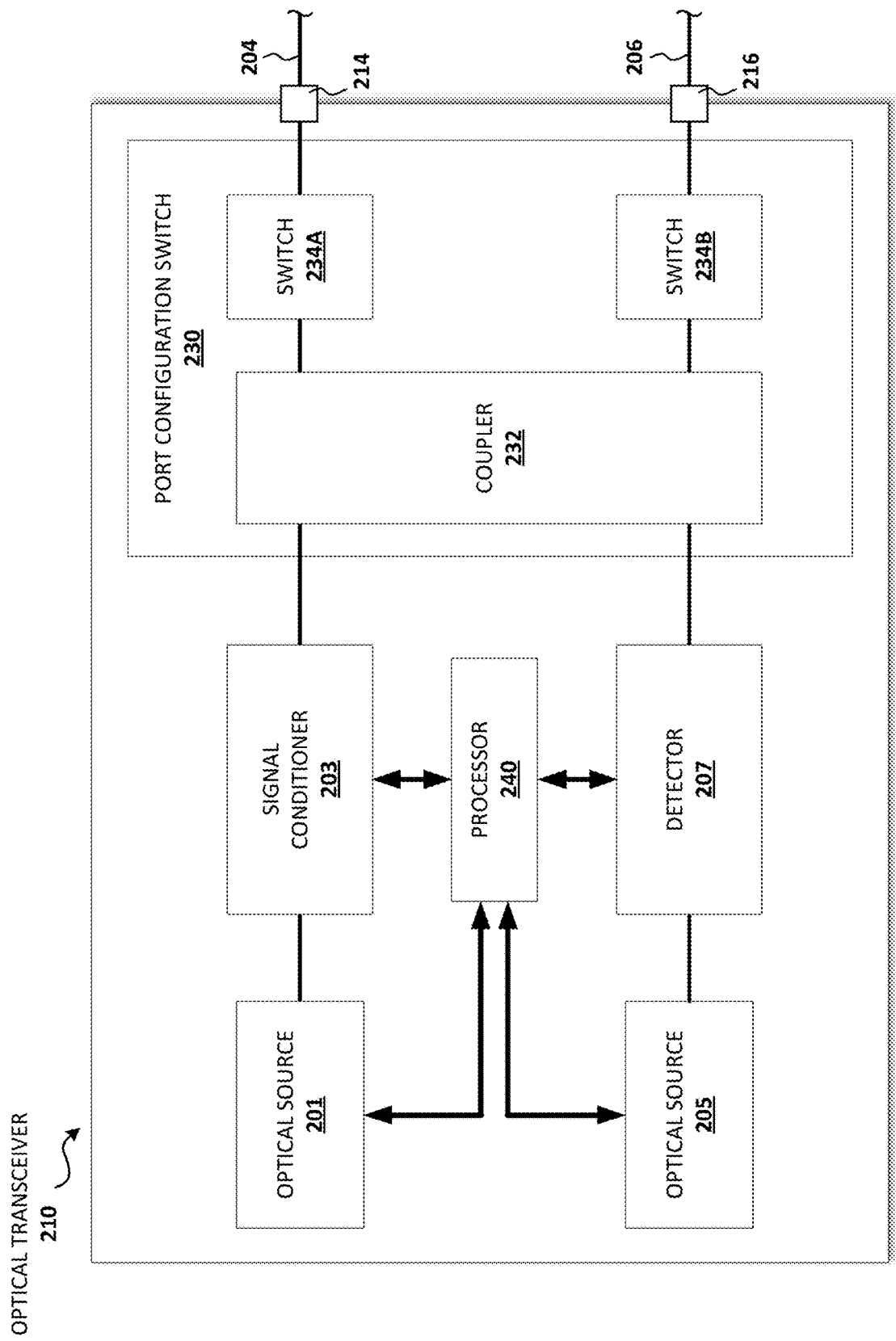
FIG. 2 is a functional block diagram depicting an optical transceiver, in accordance with an embodiment.

In some implementations, the path 104 and/or the path 106 may each respectively be configured to transmit or carry, for example, signals associated with a particular wavelength or range of wavelengths, such as can be generated and conditioned via one or more WDM techniques, as described in further detail herein with reference to FIG. 2. For example, the path 104 and/or the path 106 can be configured to transmit or carry, for example, signals having a frequency or wavelength in a range of the C band and/or the L band of the electromagnetic spectrum. As an example, the signals can have a frequency or wavelength in the range of approximately 1260 to 1625 nm. As another example, the signals can alternatively or additionally have a frequency or wavelength in the range of approximately 1530 nm to 1565 nm (e.g., C band). As another example, the signals can alternatively or additionally have a frequency or wavelength in the range of approximately 1565 nm to 1625 nm (e.g., L band). The signals can otherwise be characterized by measurement of any suitable signal characteristic, such as frequency or wavelength, signal polarization, signal amplitude, phase, or the like, such as may be used in an optical communications system such as the optical communications system 100, in accordance with embodiments of the present disclosure.

The optical transceiver 110 and the optical transceiver 120 each represent respective and individual coherent optical transceivers. The optical transceiver 110 and the optical transceiver 120 can, for example, be configured to operatively interconnect, via the path 104 and the path 106, to enable, provide, and transmit signals and communications, over a network (e.g., network 102), in optical communications system 100. The optical transceiver 110 and/or the optical transceiver 120 may be, for example, individually disposed in respective nodes (not depicted). For example, the optical transceiver 110 and the optical transceiver 120 can be disposed in an OLT and an ONU, respectively. The optical transceiver 110 and the optical transceiver 120 may each respectively and individually operate and function, for example, substantially similarly or identically to that described in further detail herein, with reference to FIG. 2.

FIG. 2 is a functional block diagram depicting an optical transceiver 210, in accordance with an embodiment. The optical transceiver 210 can be functionally and/or structurally similar to any of the optical transceivers (e.g., optical transceiver 110, optical transceiver 120), as described herein. For example, as shown, the optical transceiver 210 includes first port 214, second port 216, signal conditioner 203, detector 207, optical source 201, optical source 205, and port configuration switch 230 ("port configuration switch 230" or "optical switch 230"). The port configuration switch 230 includes switches 234A-B and coupler 232. While the optical transceiver 210 is depicted in FIG. 2 as including nine discrete devices or components (e.g., 201, 203, 205, 207, 214, 216, 230, 232, 234A, 234B, 240), interconnected by two elements (e.g., 204, 206) other arrangements are possible. For example, the optical transceiver 210 can alternatively or otherwise include any suitable number of integrated devices, materials, and the like. As another example, the port configuration switch 230 may itself be a modular or composite component, including, for example, a coupler (e.g., coupler 232), and one or more switches (e.g., switch 234A, switch 234B), such as described in further detail herein. The optical transceiver 210 can otherwise include or be suitably formed of any number of integrated, composite, pluggable, or modular components, or materials.

The optical transceiver 210 represents a coherent optical transceiver. The optical transceiver 210 can be functionally and/or structurally similar to the optical transceiver 110 and/or optical transceiver 120, respectively, as described herein. In some implementations, the optical transceiver 210 can include an optical transceiver having a first port (e.g., 214), a second port (e.g., 216), and an optical switch (e.g., 230) coupled to the first port and the second port. For example, the optical transceiver 210 can be configured to interconnect, at port 214 and port 216 and via the path 204 and the path 206, to a network (e.g., network 102). The optical transceiver 210 can be interconnected to the network such as by interconnection, via the path 204 and the path 206, with another optical transceiver (e.g., optical transceiver 120) in the network. The optical transceiver 210 can be interconnected to the network to establish, support, maintain, and facilitate a flow of network traffic through the network. For example, the optical transceiver 210 can be configured to interconnect, via first port 214 and second port 216, with an optical transceiver (e.g., optical transceiver 120), an optical receiver (not depicted), an optical transmitter (not depicted), and the like, to transmit and receive signals in the network.

In some implementations, the optical transceiver 210 is configured to be operatively interconnected, at switch 234A and switch 234B (collectively, "switch(es) 234") and by way of port 214 and port 216, respectively, in an optical communications system (e.g., optical communications system 100). The switch 234A and the switch 234B can be operatively interconnected, on a port-facing side, to the path 204 and the path 206, respectively, and further, on a non-port-facing side, to the coupler 232, such as shown in FIG. 2. In this example, the coupler 232 can be operatively interconnected, on the non-port-facing side, to signal conditioner 203 and detector 207, such as shown in FIG. 2. In this example, the signal conditioner 203 can be operatively interconnected, on the non-port-facing side, to optical source 201, such as shown in FIG. 2. In this example, the detector 207 can be operatively interconnected, on the non-port-facing side, to optical source 205, such as shown in FIG. 2.

The path 204 and the path 206 represent respective and individual links or communication channels. The path 204 and the path 206 can be functionally and/or structurally similar to the path 104 and/or the path 106, respectively, as described herein. For example, the path 204 and/or the path 206 can include one or more unidirectional paths, bidirectional paths, and the like.

The first port 214 and the second port 216 represent individual unidirectional and bidirectional ports. For example, the first port 214 and the second port 216 can be configured to interconnect to the path 204 and the path 206 to establish and facilitate one or more communication channels between the optical transceiver 210 and an optical transceiver in the network (e.g., optical transceiver 110, optical transceiver 120). The first port 214 and/or the second port 216 can include or be configured to provide, for example, a unidirectional port, a bidirectional port, and the like. The first port 214 and/or the second port 216 are configured to interconnect or couple the optical transceiver 210 to the path 204 and the path 206. The first port 214 and/or the second port 216 can be configured to be coupled to the optical source 201. Moreover, the first port 214 and/or the second port 216 can be configured to be coupled to the detector 207, with the optical source 205 configured to be coupled to and terminated at the detector 207 (e.g., local oscillator). For example, the first port 214 can be configured to interconnect and establish a communication channel linking the path 204 to the port configuration switch 230, the signal conditioner 203 and the optical source 201; and the second port 216 can be configured to interconnect and establish a communication channel linking the path 206 to the port configuration switch 230 and the detector 207 and terminating at the detector 207. In this example, the optical source 205 can be separately interconnected to the detector to provide local oscillator signals (e.g. for beating or mixing with inbound or received signals)

In some implementations, the optical transceiver 210 can be configured to provide control over a signal direction, or directional isolation of signals conveyed between the first port 214 and the second port 216 and the optical source 201 and the optical source 205, to enable selective directional signal control, such as via the coupler 232, as described in further detail herein. For example, the directional signal control can be implemented to block signals traveling from the port 214, through the switch 234A, through the coupler 232, and into the signal conditioner 203, to prevent signals from the first port 214 from being input to the signal conditioner 203. This can have the effect of reducing noise, undesired interference, and the like. In some implementations, the first port 214 and the second port 216 can be configured to be coupled to an optical transceiver (e.g., optical transceiver 210) via an external wavelength multiplexer, and the like.

In some implementations, the first port 214 and/or the second port 216 are configured to interface with electrical signals to enable management and configuration of the optical transceiver 210 (e.g., via execution of a software-defined command). In some implementations, the first port 214 and the second port 216 are configured to enable management and configuration of one or more operating modes of the optical transceiver 210. One or more of the operating modes can include, for example, a unidirectional port operation mode and a bidirectional port operation mode. In some implementations, when the optical switch is in the unidirectional port operation mode, the optical transceiver is configured to operate as a unidirectional optical transceiver. In some implementations, when the optical switch is in the bidirectional port operation mode, the optical transceiver is configured operate as a bidirectional optical transceiver. For example, the optical transceiver 210 can be configured to be interconnected with or integrated into a component such as a line card, or the like, with which the first port 214 and/or the second port 216 can be configured to interconnect and couple. In some implementations, the first port 214 and/or the second port 216 can be software-defined logical or virtual ports.

In some implementations, the optical transceiver 210 can include one or more electrical interface ports (not depicted) such as an Ethernet interface. In some implementations, the first port 214 and/or the second port 216 are configured to detect inbound or received signals (e.g., inbound received signals). For purposes of the present disclosure, "inbound signal(s)" refer to any received or westbound signal (e.g. by optical transceiver 210) via a port (e.g. port 214, port 216). Moreover, "outbound signal(s)" refer to any transmitted, sent, or eastbound signal (e.g. by or from optical transceiver 210) via a port (e.g. port 214, port 216).

The inbound or received signals can be detected independently of a switch state (e.g., of switch 234A, switch 234B). For example, an inbound signal can be detected via a photodetector (not shown) disposed at the first port 214 and/or the second port 216, independently of the switch state (e.g., of switch 234A, switch 234B), such that the inbound signal can be detected if the switch state is set to pass or block. In this example, a signal or indication of the inbound can be generated by the photodetector, and communicated to a controller (e.g. processor 240) to enable detection of the inbound signal. The signals can include, for example, narrowband wavelength signals, broadband wavelength signals, or associated spectral components or characteristics of the signals, and the like. In some implementations, the first port 214 and/or the second port 216 are configured to detect (e.g., via a photodetector, spectral discrimination, multiple (photo) detectors) the signals with a sufficient level of sensitivity so as to provide a control capability function over port operation (e.g., of optical transceiver 210).

The optical transceiver 210 can be configured to send, transmit, and/or receive optical signals via the first port 214 and/or the second port 216, such as over one or more communications links including, for example, path 204 and/or path 206. In some implementations, the optical transceiver 210 can be configured to implement one or more modulation techniques to transmit a signal. The optical transceiver 210 can be configured to transmit the signal by modulating, for example, one or more of an amplitude, frequency, phase, polarization, and wavelength characteristic of the signal.

In some implementations, when configured in a bidirectional port operation mode, the optical transceiver 210 can be configured to implement a multiplexing technique such as directional multiplexing, and the like. In some implementations, when configured in the bidirectional port operation mode to send and receive signals at different wavelengths or frequencies, the optical transceiver 210 can be configured to implement a multiplexing technique such as wavelength division multiplexing or wave-division multiplexing, and the like.

In some implementations, one or more of the modulation techniques may additionally or otherwise include, for example, amplitude-shift keying (ASK), frequency-shift keying (FSK), phase-shift keying (PSK), quadrature amplitude modulation (QAM), and polarization-division multiplexing (PDM).

In some implementations, the optical transceiver 210 can include, for example, a C-form pluggable generation (CFP) transmitter, a coherent CFP4 transmitter, a C-form pluggable generation 2—analog coherent optics (CFP2-ACO) transmitter that is coupled with a digital signal processor (DSP) chip through a pluggable interface. Moreover, the optical transceiver 210 may additionally or otherwise include, for example, CFP2, CFP8, a quad (4-channel) small form-factor pluggable (QSFP), a quad small form-factor pluggable with double density (QFSP-DD), an octal (8-channel) small form-factor pluggable (OSFP), and the like. In such implementations, the optical transceiver 210 may be implemented, for example, with the DSP internal to the pluggable module (e.g., as in digital coherent optics (DCO) modules such as CFP2-DCO) or with the DSP external to the pluggable module (e.g., as in analog coherent optics (ACO) modules such as CFP2-ACO)).

In some implementations, the optical transceiver 210 can include, for example, a coherent optical M-ary quadrature amplitude modulation (M-QAM) transceiver, a coherent polarization-multiplexed (PM) M-QAM transceiver, and the like.

In some implementations, the optical transceiver 210 can be a hot-pluggable coherent optical transceiver. The optical transceiver 210 can be functionally and/or structurally similar to the optical transceiver 110 and/or the optical transceiver 120, as described herein. In some implementations, the optical transceiver 210 can be configured to, for example, programmably switch between operating modes, including, for example, a unidirectional port operation mode and a bidirectional port operation mode. The optical transceiver 210 can be configured to receive signals such as control signals, and the like, and to switch between operating modes, as described in further detail herein.

As shown in FIG. 2, the port configuration switch 230 is coupled to the first port 214 and the second port 216 via switch 234A and switch 234B, respectively. In some implementations, the port configuration switch 230 is configured to be switchable between a unidirectional port operation mode and a bidirectional port operation mode. In some implementations, the port configuration switch 230 is configured to be switchable between the unidirectional port operation mode and the bidirectional port operation mode based on switch state configuration (e.g. of switch 234A; switch 234B). For example, the optical switch (e.g. 230) can be configured to operate in the unidirectional port operation mode when a switch state configuration of the first switch and the second switch are such that both are positioned in or set to the pass state.

When the port configuration switch 230 is in the unidirectional port operation mode, the first port (e.g., 214) can send (e.g., via path 204) a first optical signal and the second port (e.g., 216) can receive (e.g., via path 206) a second optical signal whilst also sending a third optical signal (e.g., via path 206). The first, second, and third optical signals can be sent, received, and/or detected (e.g. by optical transceiver 210), accordingly, to, from, and/or with respect to an optical transceiver in the network (e.g., optical transceiver 110, optical transceiver 120) with which the optical transceiver 210 is coupled, as described herein. In some implementations (e.g., when the port configuration switch 230 is in the unidirectional port operation mode), the third optical signal can include, for example, a control signal corresponding to a (split) instance of the first signal (e.g., split via a coupler such as coupler 232 of the optical transceiver in the network with which the optical transceiver 210 is coupled). The control signal (corresponding to the (split) instance of the first signal) can include, for example, a parasitic (optical) signal from the optical transceiver in the network with which the optical transceiver 210 is coupled. In some implementations, in response to detecting or determining that a signal characteristic of the control signal has fallen below or exceeded a predetermined threshold, the optical transceiver 210 (via the port configuration switch 230) can be configured to switch from the unidirectional port operation mode to a bidirectional port operation mode, as described herein.

When the port configuration switch 230 is in the bidirectional port operation mode, the first port can send the first optical signal and receive the second optical signal, and (e.g., in some instances and at the same time) the second port can receive or detect the third optical signal and does not receive the first signal and the second optical signal. In some implementations, a wavelength of the first optical (and the third optical signal, if present) signal may correspond to a wavelength of the second optical signal. In other implementations, a wavelength of the first optical signal (and the third optical signal, if present) may differ from a wavelength of the second optical signal.

In some implementations, the bidirectional port operation mode can include a protected bidirectional port operation mode. In the protected bidirectional port operation mode, in response to detecting or determining that a signal characteristic of the third signal (e.g., control signal) has fallen below or exceeded a predetermined threshold, the optical transceiver 210 can be configured to implement (e.g., via the port configuration switch 230) active switching (e.g., to reconfigure switch state configuration of switch 234A; switch 234B) to thereby provide path protection (e.g., over path 204 and path 206).

In addition to the switch 234A and the switch 234B, the port configuration switch 230 can include an optical coupler. In some implementations, the switch 234A is a first switch that is coupled to the first port (e.g., port 214) and is switchable between a pass state and a block state, where the first switch is in the pass state when the optical switch is in the unidirectional port operation mode. The switch 234B is a second switch that is coupled to the second port and switchable between the pass state and the block state, where the second switch is in the pass state when the optical switch is in the unidirectional port operation mode. An optical coupler (e.g., coupler 232) is coupled to the first port via the first switch and the second port via the second switch. When the port configuration switch 230 is in the bidirectional port operation mode, the first switch is in one of the pass state or the block state; and the second switch is in one of the pass state or the block state, the second switch in the block state when the first switch is in the pass state, and the second switch in the pass state when the first switch is in the block state.

For example, the optical switch (e.g. 230) is in the bidirectional port operation mode when the switch 234A is in the pass state and the switch 234B is in the block state. In some implementations, in the bidirectional port operation mode, the switch 234B is configured to enable detection (e.g. via a photodetector at port 216) of the third optical signal. For example, the optical transceiver (210) can be configured to detect (e.g. via a photodetector disposed at port 216) the third optical signal (e.g., the presence or incidence thereof at the port 216) at the port 216. In some implementations, setting a switch (e.g. switch 234A) to a particular state (e.g. pass, block) causes the state of another switch (e.g. switch 234B) to be inverted.

In some implementations, when the port configuration switch 230 is in the unidirectional port operation mode, the optical transceiver 210 is configured to operate as a unidirectional optical transceiver sending on the first optical port 214 and not the second optical port 216 and receiving on the second optical port and not the first optical port. In some instances, there may be a third signal corresponding to a parasitic output from the second optical port (and not the first optical port). In some implementations, when the port configuration switch 230 is in the bidirectional port operation mode, the optical transceiver 210 is configured to operate as a bidirectional optical transceiver sending on the first optical port and not the second optical port and receiving on the first optical port and not the second optical port. In some implementations, when the port configuration switch 230 is in the protected bidirectional port operation mode, the optical transceiver 210 is configured to operate as a bidirectional optical transceiver (configured to provide path protection), by sending on the first optical port and not the second optical port and receiving on the first optical port and the second optical port. The second optical port may be configured, for example, to receive or detect the third optical signal (e.g., corresponding to a control signal), as described herein.

The switch 234A and the switch 234B can be implemented as individual optical attenuators. For example, the switch 234A and/or the switch 234B individually include, for example, a variable optical attenuator (VOA). In some implementations, the switch 234A and the switch 234B are each configured to be switchable between a first state ("pass state") to transmit optical signals, and a second state ("block state") to block optical signals. The VOA can be configured to balance power. In some implementations, the switch 234A and/or the switch 234B can include two or more VOAs, configured to achieve independent switching and power balancing functions. For example, the switch 234A and the switch 234B may each include a VOA, configured to pass signals in a low-loss state, and to block signals in a high-loss state. In some implementations, the switch 234A and the switch 234B each include a VOA having an attenuation ratio of, for example, greater than 15 dB, greater than 20, greater than 25 dB, or greater than 30 dB. The attenuation ratio can otherwise be any other suitable value. Generally, the switch 234A and the switch 234B can be implemented as any suitable type of optical attenuator, such as described herein.

In some implementations, the switch 234A and the switch 234B can include electro-optical switches. For example, each electro-optical switch can include one or more electro-optical crystals with variable refractive index under an electric field. In some implementations, one or more of the electro-optical crystals can include, for example, at least one of Lithium Niobate (LiNbO$_3$), Lithium Tantalate (LiTaO$_3$), Lead Zirconate Titanate (Pb(Zr, Ti)O$_3$), and Lead Lanthanum Zirconate Titanate [(Pb, La)(Zr, Ti)O$_3$. In other implementations, the switch 234A and the switch 234B can include thermo-optical switches. For example, each thermo-optical switch can include a Mach-Zehnder interferometer having a thermal (signal) phase adjustment capability.

The switch 234A and the switch 234B may each include one or more Mach-Zehnder interferometers, which can be configured to split signals into two arms of the interferometers. Changing the refractive index in one arm can alter the interference between the optical signals from the two arms. For example, in some implementations, one or more of the Mach-Zehnder interferometers can be configured to switch to a constructive signal interference state by which a constructive interference can be configured as the first state to generate an output signal substantially identical to the input optical signal, while a destructive interference can be configured as the second state to generate an output signal with negligible power.

In some implementations, the switch 234A and the switch 234B may each include one or more acousto-optic switches, which can use acoustic waves to change the transmission of the switches. The switch 234A and the switch 234B may each include one or more opto-mechanical switches, configured to redirect an optical signal by moving bulk fiber optic cable elements by mechanical devices (e.g., via beam deflection). For example, in some implementations, one or more of the opto-mechanical switches can use a stepper motor to move a mirror that directs the optical signal light from the input to the desired output. In some implementations, the switch 234A and the switch 234B can be configured to provide for power balancing. For example, in some implementations, where the signal input levels (e.g., amplitude, etc.) are distinct, the signals arriving at the coupler 232 from the first port 214 and the second port 216 can also be different if no compensation or balancing is performed.

The coupler 232 represents an optical coupler (e.g., combiner), and an optical splitter (e.g., beam splitter), depending on signal direction. For example, the coupler 232 can be configured to function as a splitter with respect to outbound (e.g., eastbound, transmitted) signals, and as a coupler with respect to inbound (e.g., westbound, received) signals. The coupler 232 can be coupled to the first port (e.g., 214) via the first switch (e.g., 234A) and to the second port (e.g., 216) via the second switch (e.g., 234B). In some implementations, the coupler 232 can include a colorless 2×2 coupler.

In some implementations, the coupler 232 can include, for example, one or more of Mach-Zehnder interferometers, configured to combine signals into one of the arms to effectively provide a 2×2 coupler by which to further optimize losses when switching between unidirectional and bidirectional port operation modes. In such implementations, (e.g., where the coupler 232 includes one or more Mach-Zehnder interferometers) the coupler 232 and one or more switches (e.g., switches 234) can be disposed on a common waveguide. Accordingly, when the coupler 232 includes one or more of Mach-Zehnder interferometers, the coupler 232 can be implemented to provide a fixed or variable optical attenuation capability. For example, in some implementations, when the coupler 232 includes one or more of Mach-Zehnder interferometers, the coupler 232 can be implemented to provide a fixed signal split/combine capability (e.g., for 50/50 power split of signals). As another example, in some implementations, when the coupler 232 includes one or more of Mach-Zehnder interferometers, the coupler 232 can be implemented to provide a variable signal split/combine capability (e.g., for 100/0 and/or 0/100 power split of signals). In some implementations, the optical transceiver 210 is configured to implement directional isolation of signals conveyed between the first port 214 and the second port 216 and the optical source 201 and the optical source 205, to enable selective directional signal control, via the coupler 232, as described herein.

The optical source 201 and/or the optical source 205 represent optical signal sources, adjustable signal sources, and the like. For example, the optical source 201 and/or the optical source 205 can include an optical signal source such as a fixed laser source, a tunable laser source, and the like. The optical source 201 and the optical source 205 can include, for example, a tunable laser source. The optical source 205 can include a local oscillator (LO). The optical source 201 can be configured to operate in conjunction with the signal conditioner 203 to enable optical signal transmission (e.g., by optical transceiver 210 for sending signals at specific wavelength). The optical source 201 can be configured to operate in conjunction with the detector 207 to enable optical signal reception and/or detection capability (e.g., of or by optical transceiver 210 for receiving signals having specific wavelength). In some instances, the optical source 201 and the optical source 205 can be respectively tuned to send and receive signals at corresponding or different wavelengths, frequencies, or a range of wavelengths or frequencies. In some implementations, when the optical switch is in the unidirectional port operation mode, the optical source 201 can output light at a first frequency that is associated with (i) the first optical signal, and when the optical switch is in the bidirectional port operation mode, the optical source 201 can output light at the first frequency that is associated with (ii) the first optical signal and the third optical signal. In such implementations, the optical source 205 can be a second optical source coupled to the detector 207. When the detector 207 is coupled to the optical source 205, the second optical source can output light at a second frequency that is associated with the second optical signal when the optical switch is in the unidirectional port operation mode.

The signal conditioner 203 represents a signal modulator. In some implementations, the signal conditioner 203 can include a coherent signal modulator. The signal conditioner 203 can be configured to add, combine, convert, or condition a carrier or baseband signal with a signal to be to be transmitted to provide a signal transmission for communication. For example, the signal conditioner 203 can be configured to use amplitude and phase of light, as well as two orthogonal polarizations, to transmit multiple bits per symbol across fiber (e.g., path 204, path 206). In some implementations, the signal conditioner 203 can be configured to implement one or more modulation formation formats including, for example, M-ary phase shift keying (such as Quadrature Phase-Shift Keying (QPSK)) and quadrature-amplitude-modulation (QAM). The modulation formats have an in-phase (I) component and a quadrature phase (Q) component (i.e., IQ). Additionally, the modulation format can be carried by two orthogonal polarizations, represented as X polarization and Y polarization. This is known as polarization multiplexing (PM). In some implementations, the signal conditioner 203 can include, for example, a polarization multiplexing, in-phase & quadrature modulator (PM-IQ-MOD).

For example, using 16-QAM modulation format with 4 bits per symbol and multiplexing two polarizations at a 32G baud (symbol rate), a single wavelength can achieve 256 Gbps per channel and thereby effectively provide, for example, 200 Gbps bandwidth. As another example, by using a WDM configuration with eight wavelengths carrying 256 Gbps each, the raw bit rate across the fiber can reach 2048 Gbps (2.048 Terabits per second—Tbps). Each data channel (e.g., path 204, 206) can include two polarization tributaries, each of which being a polarization that contains In-Phase and Quadrature components. Accordingly, each symbol has a defined duration determined by the symbol rate. The number of bits per symbol may range from two bits (e.g., via QPSK with single polarization) up to eight bits (e.g., via 16-QAM with two polarizations). In some implementations, the number of bits per symbol period can be chosen based on the particular modulation format used—for example, 1 bit/symbol via BPSK, 6 bits/symbol (or 12 bits/symbol in a dual (signal) polarization mode) via 64QAM and the like. Generally, any suitable modulation format can be used, in accordance with embodiments of the present disclosure.

The detector 207 represents a signal demodulator. In some implementations, the detector 207 can include a coherent signal demodulator. The detector 207 can be configured to detect a signal by mixing the signal with that from a local oscillator (LO) (e.g., optical source 205) at the receiver side. If the LO light is at the same wavelength, phase, and polarization as the carrier of the signal, the LO and signal will beat against each other and create a baseband signal retaining the information content that is much larger in amplitude than the incoming signal, making it easy to detect, or extract. That is, if there is a closely spaced adjacent channel and the LO is tuned to that channel, there will be a new baseband signal representative of the adjacent channel. Accordingly, the detector 207 may retrieve the bit information (e.g., bits encoded onto the received signal) for further processing at the processor 240, as described in further detail herein.

In some implementations, if a PM modulation format was used to form the optical signal that is received by the optical transceiver 210, the detector 207 can separate the received signal into two polarizations, and further, to demodulate the received signal on each polarization into I and Q components. The detector 207 can convert (e.g., via processor 240) the demodulated analog signal to a digital signal (e.g., via processor 240), to compensate for any transmission impairments introduced along the path (e.g., path 204, path 206).

The processor 240 represents a compute device such as a controller. The processor 240 can include any suitable type of processor capable of executing computer instructions and/or code, such as can be stored on a machine-, processor-, and/or computer-readable medium. The processor 240 can include electronic circuitry including, for example, programmable logic circuitry, field-programmable gate arrays (FPGA), or programmable logic arrays (PLA), configured to execute computer- or machine-readable program instructions, by using state information of the computer readable program instructions to personalize the electronic circuitry, so as to perform various aspects of the present disclosure. For example, the processor 240 can include any combination of hardware-based components, such as a field-programmable gate array (FPGA), an application specific integrated circuit (ASIC), a digital signal processor (DSP), a microcontroller, and/or the like. The processor 240 may additionally or otherwise be a software-based compute device (e.g., as in computer code stored in memory and/or executed at the processor), configured to execute one or more specific functions, in accordance with embodiments of the present disclosure.

In some implementations, when in a unidirectional port operation mode, the optical transceiver 210 can be configured to use the same wavelength for sending that it does for receiving, in which case optical transceiver 210 can be configured to use the same laser, that is, the local oscillator (e.g., optical source 205) for transmitting as it does for receiving. In such implementations, the same wavelength can be used to send a first optical signal having a wavelength corresponding to that of a second optical signal. In some implementations, the optical transceiver 210 can be configured to use a different wavelength for sending than it does for receiving, in which case the optical transceiver 210 may implement two different lasers (e.g., optical source 201, optical source 205)—one for each direction. In such implementations, a first optical signal can have a wavelength different than that of a second optical signal.

In some implementations, one or more of the switches 234 can be remotely configured, via software, by a processor such as the processor 240. For example, the processor can actuate, select, or set a switch (e.g., one or more of switches 234) to the first state or the second state based on a desired operation mode or in response to a particular operating parameter (e.g., one exceeding or falling outside a threshold) of an optical transceiver such as the optical transceiver 210. In operation, an operating mode of the optical transceiver can be configured based on various combinations of settings or switch configurations of the switch 234A and the switch 234B.

For example, in some instances, when the switch 234A and the switch 234B are each set to a first state (e.g., pass state), the optical transceiver 210 may operate in a first operating mode, such as a simplex, or unidirectional port operation mode, and be configured to send or pass signals at both ports (e.g., port 214, port 216). As another example, in some instances, when the switch 234A is set to the first state and the switch 234B is set to a second state, the optical transceiver 210 may operate in a second operating mode, such as in a duplex, or bidirectional port operation mode, and can send or pass signals at a first port (e.g., port 214), and attenuate or block signals at a second port (e.g., port 216). As another example, in some instances, when the switch 234A is set to the second state and the switch 234B is set to the first state, the optical transceiver 210 may operate in a third operating mode, such as in a duplex, or bidirectional port operation mode, and can send or pass signals at a second port (e.g., port 216), and attenuate or block signals at a first port (e.g., port 214).

In the first operating mode, the optical transceiver 210 can be configured to operate such that wavelengths or frequencies at which signals are sent (e.g., transmitted via optical source 201) and received (e.g., detected via optical source 205) can be equal. In the second operating mode or the third operating mode, the optical transceiver 210 can be configured to operate such that wavelengths or frequencies at which signals are sent (e.g., transmitted via optical source 201) and received (e.g., detected via optical source 205) are not equal. Accordingly, the optical transceiver 210 can be configured, remotely and via software, to operate in any of the first, second, and third operating modes. This is enabled by using a colorless 2×2 coupler in conjunction with various combinations of configurations of VOAs (e.g., switch 234A, switch 234B).

In some instances, an optical transceiver such as the optical transceiver 210 can be configured to operate in a fourth operating mode, such as when the optical transceiver is implemented at a head end of a (communications) path, in which case both switches (e.g., switches 234) can be set to pass. The fourth operating mode can include a unidirectional port operation mode (e.g., such as the first unidirectional port operation mode, described herein). In some implementations, an optical transceiver such as the optical transceiver 210 can be configured to operate in the first operating mode or the fourth operating mode to send and receive signals along paths (e.g., path 204, path 206).

In some implementations, such as when the optical transceiver 210 is configured to operate in the second operating mode or the third operating mode, inbound signals at ports for which the associated switch is in the block state (e.g., in the second operating mode, switch 234B is in block state at port 216; in the third operating mode, switch 234A is in block state at port 214) can be detected at the ports, before reaching the associated switch that is in the block state. That is, in the second operating mode or the third operating mode, an attribute of inbound signals at the ports from each path can be measured by a detector (e.g. photodetector, not shown), such as may be disposed in the path at a position adjacent to the ports and preceding a position of the switches 234 along the path.

In some implementations, the switch 234A and/or the switch 234B can be configured to provide a control port function based on measurement (e.g. via a photodetector) of a signal characteristic of an inbound signal at a port for which the associated switch is in the block state. In some implementations, detection of the inbound signals at the ports can include, for example, measurement of a signal characteristic such as signal wavelength, signal power, and the like. In some implementations, detection of the inbound signals at the ports can include, for example, measurement of a signal characteristic such as signal polarization of the inbound signals. In some implementations, detection of the inbound signals at the ports can include, for example, measurement of a signal characteristic such as signal spectrum of the inbound signals. In any case, in response to determining that the signal characteristic (e.g. power), for example, exceeds or falls below a predefined threshold, a switching action, such as a path switch or protection operation, can be performed, accordingly. For example, when a signal characteristic such as power (e.g., signal power) falls below a predefined threshold (e.g., predefined power level threshold), this can indicate a path failure event (e.g., fiber break), causing a loss of signal.

For example, in case of a path failure event such as a path (e.g., fiber) break (e.g., on path 206), a signal characteristic such as a power level of an inbound signal at a port (for which the associated switch is in the block state) may cease—in which case the path failure event (e.g., path break) can be confirmed. Accordingly, in response to detection of the path failure event, the optical transceiver 210 can be configured via software to operate in a duplex or bidirectional port operation mode, that is, in the second operating mode or the third operating mode, so as to provide path protection (e.g., over path 204 and path 206). In the duplex or bidirectional port operation mode, the path interconnected to the port for which the associated switch is in the pass state serves as the working path, and the path interconnected to the port for which the associated switch is in the block state serves as the protect path. Accordingly, this enables the optical transceiver 210 to provide for greater (e.g., path) availability via the path protection, as described herein.

In some implementations, the optical transceiver 210 is reconfigurable between a 1+1 protection scheme and a 1:1 protection scheme. For example, in some implementations, when operating in the bidirectional port operation mode, the optical transceiver 210 can provide 1+1 protection over path 204 (e.g., working path) via path 206 (e.g., backup path). The optical transceiver 210 can otherwise be configured to provide any suitable type of path protection.

Figure 3:
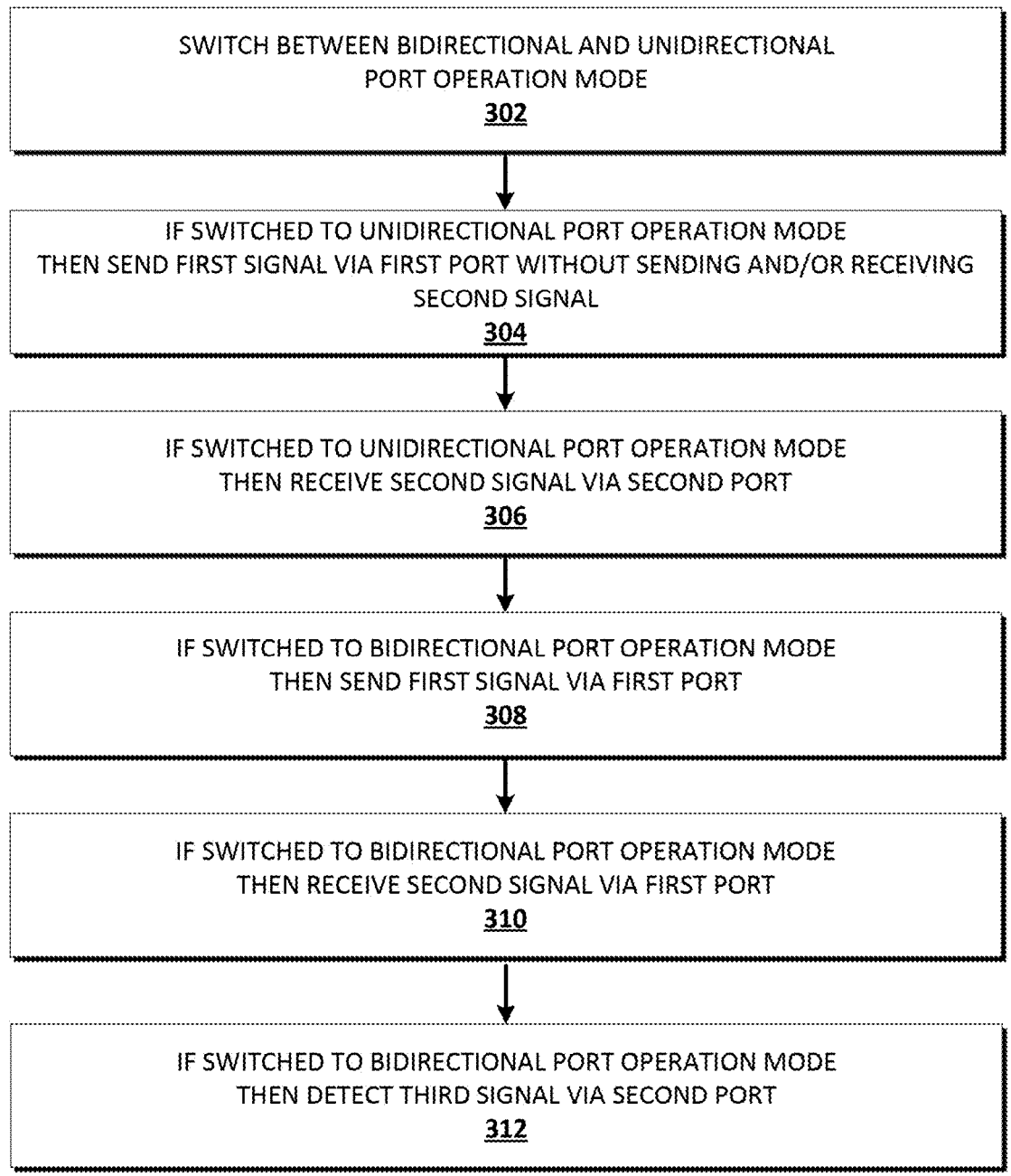
FIG. 3 is a flowchart depicting an example operation of a coherent optical transceiver, in accordance with an embodiment.

FIG. 3 is a flowchart depicting an example operation of a coherent optical transceiver, in accordance with an embodiment. The coherent optical transceiver can include optical transceiver 110, optical transceiver 210, and the like. In some implementations, the example operation can be executed by a processor such as the processor 240 to cause the processor to perform one or more parts of the example operation.

At 302, a processor (e.g., processor 240) switches an optical transceiver (e.g., optical transceiver 110, optical transceiver 210) between a bidirectional port operation mode and a unidirectional port operation mode. At 304, the processor sends, in the unidirectional port operation mode and via a first port (e.g., port 214), a first optical signal while not sending and not receiving a second optical signal. At 306, the processor receives, in the unidirectional port operation mode and via a second port (e.g., port 216), the second optical signal. At 308, the processor sends, in the bidirectional port operation mode and via the first port, the first optical signal. At 310, the processor receives, in the bidirectional port operation mode and via the first port, the second optical signal. At 312, the processor detects, in the bidirectional port operation mode (e.g., protected bidirectional port operation mode) and via the second port, a third optical signal (e.g., and not receiving the first signal and the second optical signal).

Figure 4:
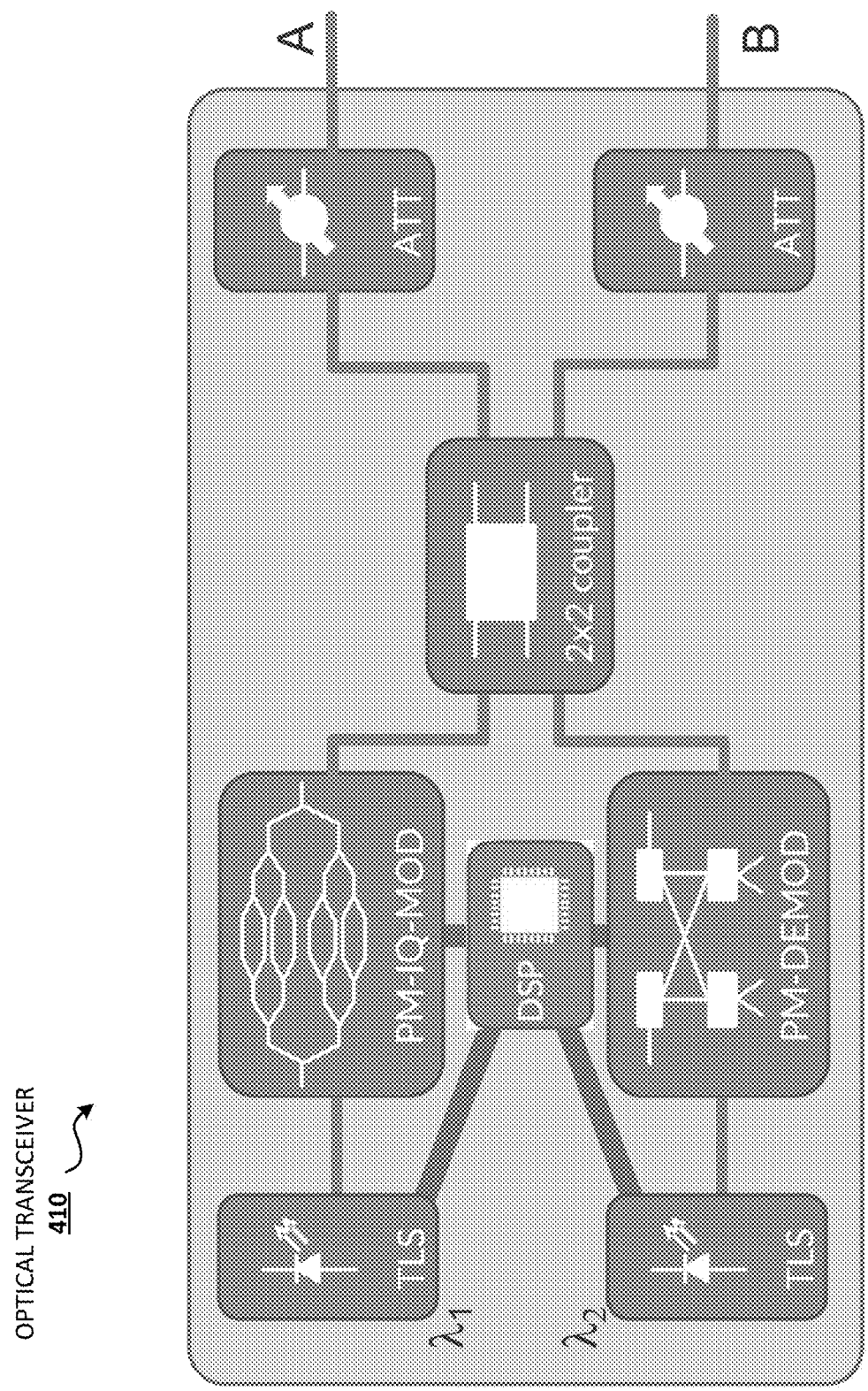
FIG. 4 is a functional block diagram depicting an example optical transceiver, in accordance with an embodiment.

FIG. 4 is a functional block diagram depicting an example optical transceiver 410, in accordance with an embodiment. The optical transceiver 410 can be functionally and/or structurally similar to any of the optical transceivers (e.g., optical transceiver 210), as described herein. For example, as shown, the optical transceiver 410 includes port A, port B, a signal conditioner such as a polarization multiplexing, in-phase & quadrature modulator (labeled "PM-IQ-MOD"), a detector such as a polarization-multiplexed demodulator (labeled "PM-DEMOD"), a first optical source such as a tunable laser source (TLS), a second optical source such as a TLS, a processor such a digital signal processor (labeled "DSP"), and an optical switch (not labeled). The optical switch can be functionally and/or structurally similar to any of the optical switches (e.g., port configuration switch 230), as described herein. For example, the optical switch can include a coupler (labeled "2×2 coupler"), a first switch such as an optical attenuator (labeled "ATT"), and a second switch such as an optical attenuator (labeled "ATT"). In some implementations, the PM-IQ-MOD and the PM-DEMOD can be implemented on a common waveguide. This enables other components to be disposed on the same integrated circuit (IC).

Figure 5:
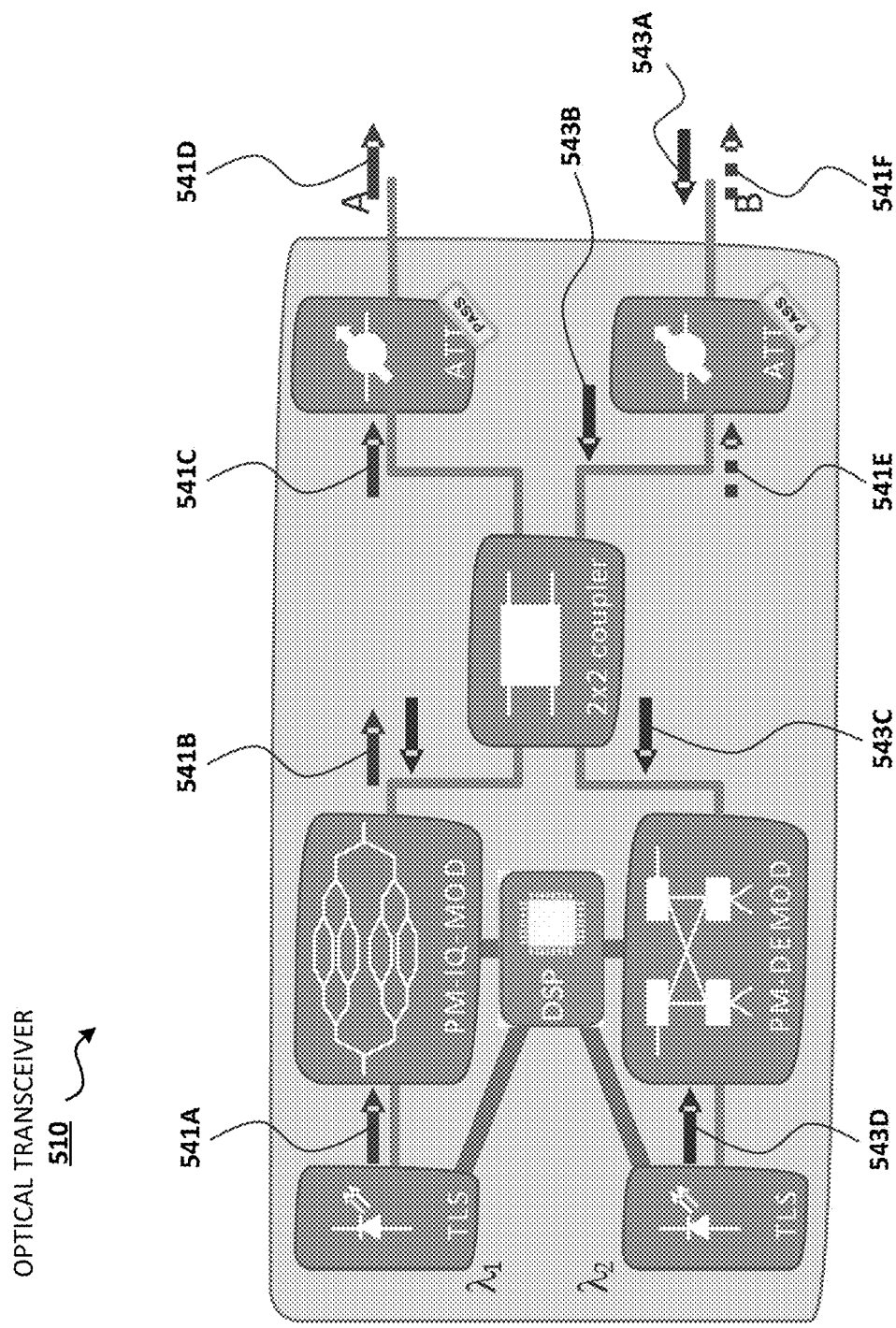
FIG. 5 is a functional block diagram depicting an example optical transceiver when switched to a first operating mode, in accordance with an embodiment.

FIG. 5 is a functional block diagram depicting an example optical transceiver 510 when switched to a first operating mode, in accordance with an embodiment. The optical transceiver 510 can be functionally and/or structurally similar to any of the optical transceivers (e.g., optical transceiver 210, optical transceiver 410), such as described herein. For example, as shown in FIG. 5, the example optical transceiver 510 includes an optical port configuration switch that includes a 2×2 coupler and two variable optical attenuators, (labeled "ATT").

As illustrated in FIG. 5, switching the optical transceiver between a bidirectional port operation mode and a unidirectional port operation mode, such as to switch to the first operating mode, can include setting a first switch, configured to be switched between a pass state and a block state, to the pass state, and setting a second switch, configured to be switched between the pass state and the block state, to the pass state. Accordingly, the optical transceiver 510 can send signals (e.g., signals 541A-D), at a first wavelength and from the first optical source TLS, via the port A, and further, can receive signals (e.g., signals 543A-C), via the port B and at a second wavelength, for detection (e.g., via signal(s) 543D from the second optical source TLS). The signals output at the first wavelength via the port B represent parasitic output from the port. The first and second wavelengths can correspond or differ, as described herein. For example, from a transmit end (e.g., at optical transceiver 510) signal 541F can include a working bidirectional signal and signal 541D can include a control signal. In some implementations, the optical transceiver 510 can be configured (e.g., switched), at a head end of a (communications) path, to a head end port operation mode—such as for communications with an optical transceiver such as the optical transceiver 510 (e.g., when switched into the second operating mode or the third operating mode, as described herein) at a tail end of the (communications) path.

Figure 6:
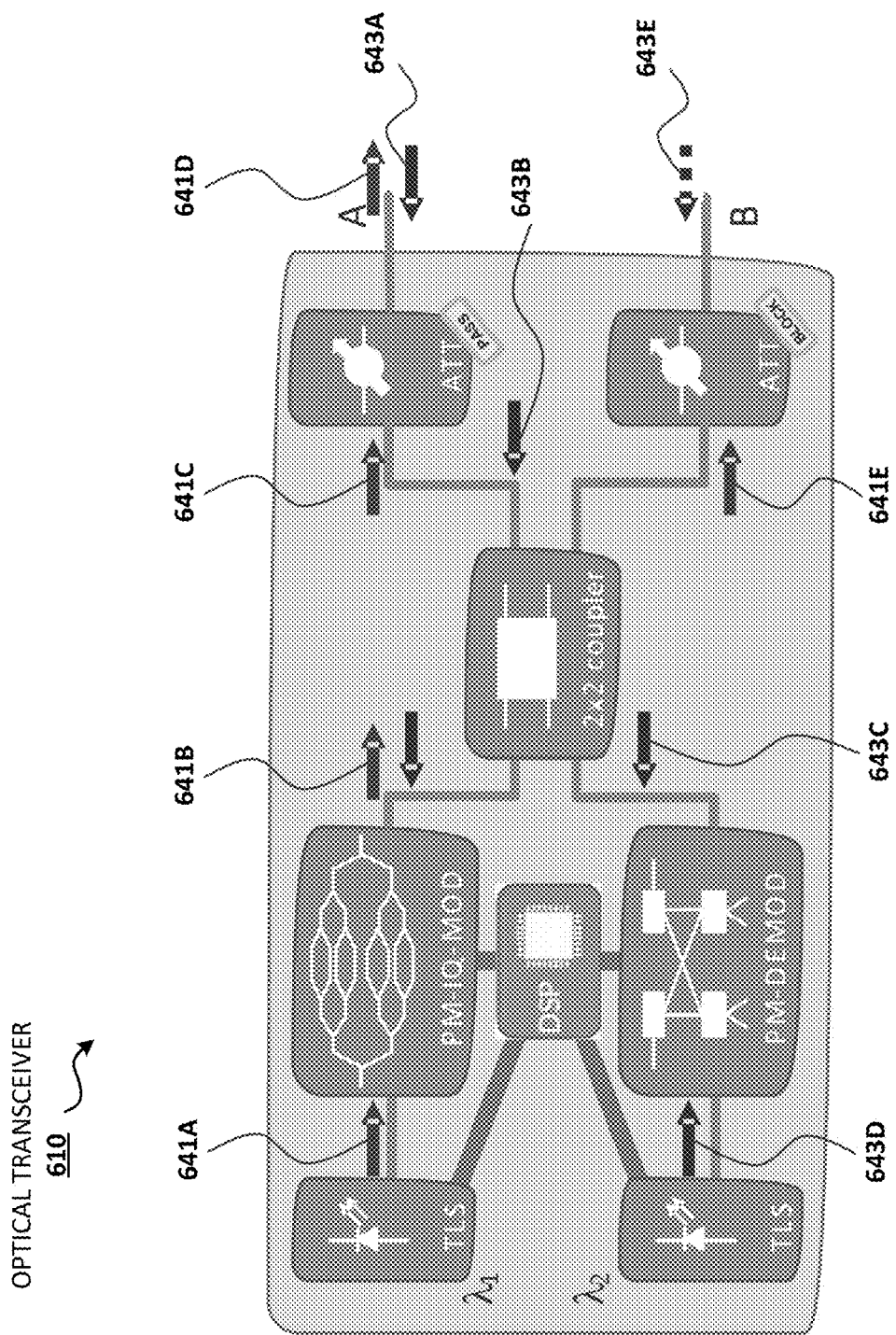
FIG. 6 is a functional block diagram depicting an example optical transceiver when switched to a second operating mode, in accordance with an embodiment.

FIG. 6 is a functional block diagram depicting an example optical transceiver 610 when switched to a second operating mode, in accordance with an embodiment. The optical transceiver 610 can be functionally and/or structurally similar to any of the optical transceivers (e.g., optical transceiver 210, optical transceiver 410, optical transceiver 510), such as described herein. Accordingly, the optical transceiver 610 can send signals (e.g., signals 641A-E), at a first wavelength and from the first optical source TLS, via the port A, and further, can detect and/or receive signals (e.g., signals 643A-C), via the port B and at a second wavelength, for detection (e.g., via signal(s) 643D from the second optical source TLS). Moreover, the signal(s) 643E (e.g. parasitic signal(s)) can be detected (e.g. as in control signal detection) at the port B. For example, the inbound signals (e.g. 643E) at the port B can be detected (e.g. via photodetector) and used as an indication or control signal by which a control operation of the optical transceiver 610 can be performed, as described herein. The first and second wavelengths can correspond such as in bidirectional port operation of the optical transceiver 610. The first and second wavelengths can otherwise differ (e.g., as in unidirectional port operation), as described herein.

Figure 7:
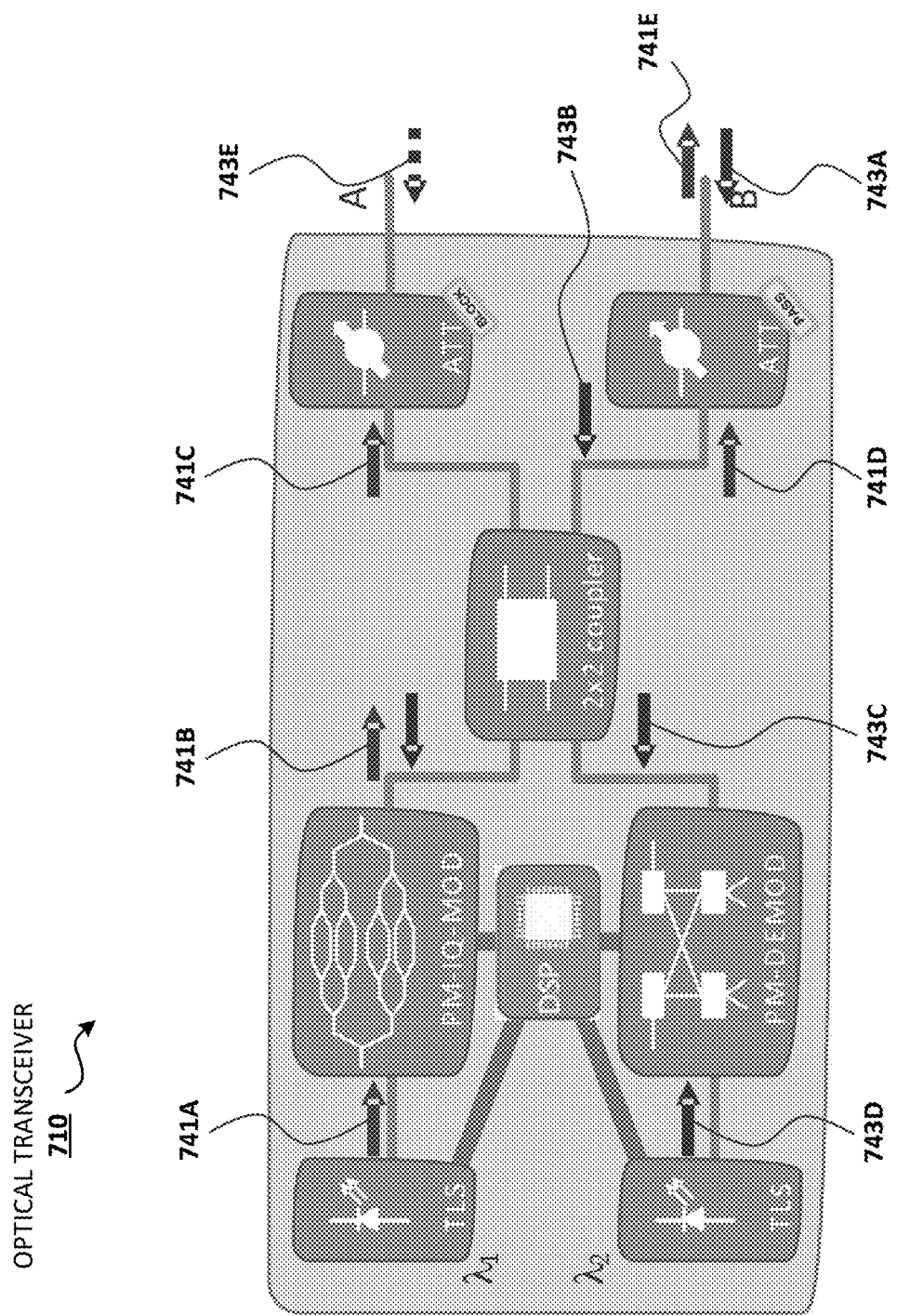
FIG. 7 is a functional block diagram depicting an example optical transceiver when switched to a third operating mode, in accordance with an embodiment.

FIG. 7 is a functional block diagram depicting an example optical transceiver 710 when switched to a third operating mode, in accordance with an embodiment. The optical transceiver 710 can be functionally and/or structurally similar to any of the optical transceivers (e.g., optical transceiver 210, optical transceiver 410, optical transceiver 510, optical transceiver 610), such as described herein. Accordingly, the optical transceiver 710 can send signals (e.g., signals 741A-E), at a first wavelength and from the first optical source TLS, via the port B, and further, can detect and/or receive signals (e.g., signals 743A-C), via the port B and at a second wavelength, for detection (e.g., via signal(s) 743D from the second optical source TLS). Moreover, the signal(s) 743E (e.g. parasitic signal(s)) can be detected (e.g. as in control signal detection) at the port A. For example, the inbound signals at the port A can be detected (e.g. via photodetector) and used as a control signal to control operation of the optical transceiver 710, as described herein. The first and second wavelengths can correspond or differ, as described herein.

In some implementations, switching the optical transceiver between a bidirectional port operation mode and a unidirectional port operation mode, such as to switch to the third operating mode, can include setting a first switch, configured to be switched between a pass state and a block state, to the block state, and setting a second switch, configured to be switched between the pass state and the block state, to the pass state. In some implementations, sending, in the bidirectional port operation mode and via the first port, the first optical signal can include sending the first optical signal at a wavelength distinct from a wavelength of the second optical signal.

Detailed embodiments of the present disclosure are disclosed herein for purposes of describing and illustrating claimed structures and methods that can be embodied in various forms, and are not intended to be exhaustive in any way, or limited to the disclosed embodiments. Many modifications and variations will be apparent without departing from the scope of the disclosed embodiments. The terminology used herein was chosen to best explain the principles of the one or more embodiments, practical applications, or technical improvements over current technologies, or to enable understanding of the embodiments disclosed herein. As described, details of well-known features and techniques can be omitted to avoid unnecessarily obscuring the embodiments of the present disclosure.

References in the specification to "one embodiment," "an embodiment," "an example embodiment," or the like, indicate that the embodiment described can include one or more particular features, structures, or characteristics, but it shall be understood that such particular features, structures, or characteristics may or may not be common to each and every disclosed embodiment of the present disclosure herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

While some implementations have been described and illustrated herein, a variety of other means and/or structures for performing the function and/or obtaining the results and/or one or more of the advantages is possible. More generally, parameters, dimensions, materials, and configurations described herein are meant to be exemplary and that the actual parameters, dimensions, materials, and/or configurations will depend upon the specific application or applications for which the inventive teachings is/are used. It is, therefore, to be understood that the foregoing embodiments are presented by way of example only and that, within the scope of the appended claims and equivalents thereto; and that embodiments can be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

Also, various concepts can be embodied as one or more methods, of which an example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments.

What is claimed is:

1. An apparatus, comprising:
an optical transceiver having a first port, a second port and an optical switch coupled to the first port and the second port, the optical switch including a first switch coupled to the first port, a second switch coupled to the second port, and an optical coupler coupled to the first port via the first switch and the second port via the second switch,
the optical switch switchable between a unidirectional port operation mode and a bidirectional port operation mode,
when the optical switch is in the unidirectional port operation mode,
the first port configured to send a first optical signal, and
the second port configured to receive a second optical signal,
when the optical switch is in the bidirectional port operation mode,
the first port configured to send the first optical signal and receive the second optical signal, and
the second port configured to detect a third optical signal and not receive the first optical signal and the second optical signal.

2. The apparatus of claim 1, wherein the optical switch includes:
the first switch being switchable between a pass state and a block state; and
the second switch being switchable between the pass state and the block state.

3. The apparatus of claim 1, wherein the optical switch includes:
the first switch coupled to the first port and switchable between a pass state and a block state, the first switch in the pass state when the optical switch is in the unidirectional port operation mode;
the second switch coupled to the second port and switchable between the pass state and the block state, the second switch is in the pass state when the optical switch is in the unidirectional port operation mode;
when the optical switch is in the bidirectional port operation mode,
the first switch is in one of the pass state or the block state, and
the second switch is in one of the pass state or the block state, the second switch in the block state when the first switch is in the pass state, and the second switch in the pass state when the first switch is in the block state.

4. The apparatus of claim 1, wherein the bidirectional port operation mode includes a protected bidirectional port operation mode.

5. The apparatus of claim 3, wherein a wavelength of the first optical signal differs from a wavelength of the second optical signal.

6. The apparatus of claim 4, wherein the optical switch includes:
the first switch coupled to the first port and switchable between a pass state and a block state, the first switch in the pass state for the first optical signal and the second optical signal when the optical switch is in the bidirectional port operation mode;
the second switch coupled to the second port and switchable between the pass state and the block state, the second switch is in the block state for the first optical signal and the second optical signal and configured to detect the third optical signal when the optical switch is in the bidirectional port operation mode.

7. The apparatus of claim 1, further comprising:
a first optical source coupled to the optical protection switch, the first optical source configured to output light at a first frequency; and
a second optical source coupled to an optical detector, the second optical source configured to output light at a second frequency;
the optical detector coupled to the optical switch.

8. The apparatus of claim 1, further comprising:
a first optical source coupled to the optical switch, the first optical source outputting light at a first frequency, the first optical signal having the first frequency when the optical switch is in the unidirectional port operation mode, the first optical signal and the third optical signal having the first frequency when the optical switch is in the bidirectional port operation mode; and
a second optical source coupled to an optical detector, the optical detector coupled to the optical switch, the second optical source outputting light at a second frequency, the second optical signal having the second frequency associated when the optical switch is in the unidirectional port operation mode or the bidirectional port operation mode.

9. A machine-readable medium storing code representing instructions to be executed by a processor, the code comprising code to cause the processor to:
switch an optical switch between a bidirectional port operation mode and a unidirectional port operation mode, the bidirectional port operation mode including a protected bidirectional port operation mode, the optical switch including a first switch coupled to a first port, a second switch coupled to a second port, and an optical coupler coupled to the first port via the first switch and the second port via the second switch;
send, in the unidirectional port operation mode and via the first port, a first optical signal and not sending and not receiving a second optical signal;
receive, in the unidirectional port operation mode and via the second port, the second optical signal;
send, in the bidirectional port operation mode and via the first port, the first optical signal;
receive, in the bidirectional port operation mode and via the first port, the second optical signal; and
detect, in the bidirectional port operation mode and via the second port, a third optical signal and not receiving the first signal and the second optical signal.

10. The machine-readable medium of claim 9, wherein the code to switch between a bidirectional port operation mode and a unidirectional port operation mode includes code to:
set the first switch, switchable between a pass state and a block state, to the pass state; and
set the second switch, switchable between the pass state and the block state, to the pass state.

11. The machine-readable medium of claim 10, wherein the code to send, in the unidirectional port operation mode and via the first port, the first optical signal and not sending and not receiving the second optical signal includes code to:
send the first optical signal at a wavelength corresponding to a wavelength of the second optical signal.

12. The machine-readable medium of claim 10, wherein the code to send, in the unidirectional port operation mode and via the first port, the first optical signal and not sending and not receiving the second optical signal includes code to:
send the first optical signal at a wavelength distinct from a wavelength of the second optical signal.

13. The machine-readable medium of claim 9, wherein the code to switch between a bidirectional port operation mode and a unidirectional port operation mode includes code to:
set the first switch, switchable between a pass state and a block state, to the pass state; and
set the second switch, switchable between the pass state and the block state, to the block state.

14. The machine-readable medium of claim 9, wherein the code to switch between a bidirectional port operation mode and a unidirectional port operation mode includes code to:
set the first switch, switchable between a pass state and a block state, to the block state; and
set the second switch, switchable between the pass state and the block state, to the pass state.

15. The machine-readable medium of claim 13, wherein to code to send, in the bidirectional port operation mode and via the first port, the first optical signal includes code to:
send the first optical signal at a wavelength distinct from a wavelength of the second optical signal.

16. The machine-readable medium of claim 14, wherein the code to send, in the bidirectional port operation mode and via the first port, the first optical signal includes code to:
send the first optical signal at a wavelength distinct from a wavelength of the second optical signal.

17. An apparatus, comprising:
an optical transceiver having a first port, a second port and an optical switch coupled to the first port and the second port, the optical switch including a first switch coupled to the first port, a second switch coupled to the second port, and an optical coupler coupled to the first port via the first switch and the second port via the second switch
the optical switch switchable between a unidirectional port operation mode and a bidirectional port operation mode,
when the optical switch is in the unidirectional port operation mode, the optical transceiver configured to operate as a unidirectional optical transceiver,
when the optical switch is in the bidirectional port operation mode, the optical transceiver configured operate as a bidirectional optical transceiver.

18. The apparatus of claim 17, wherein
when the optical switch is in the unidirectional port operation mode, the optical transceiver configured to operate as the unidirectional optical transceiver sending on the first port and not the second port and receiving on the second port and not the first port,
when the optical switch is in the bidirectional port operation mode, the optical transceiver configured to operate as the bidirectional optical transceiver sending on the first port and receiving on the first port and receiving on the second port.

19. The apparatus of claim 17, wherein the first switch or the second switch comprises a variable optical attenuator (VOA).

20. The apparatus of claim 17, wherein the optical coupler comprises a Mach-Zehnder interferometers (MZI).

* * * * *